United States Patent
Ramanathan et al.

(10) Patent No.: US 10,262,039 B1
(45) Date of Patent: Apr. 16, 2019

(54) PROXIMITY-BASED SEARCHING ON ONLINE SOCIAL NETWORKS

(71) Applicant: Facebook, Inc., Menlo Park, CA (US)

(72) Inventors: Madhu Ramanathan, Mountain View, CA (US); Taroon Mandhana, Cupertino, CA (US); Chun-Yang Chen, Sunnyvale, CA (US); Zhongxian Chen, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 422 days.

(21) Appl. No.: 14/997,255

(22) Filed: Jan. 15, 2016

(51) Int. Cl.
*G06F 17/30* (2006.01)
(52) U.S. Cl.
CPC .. *G06F 17/30528* (2013.01); *G06F 17/30554* (2013.01)
(58) Field of Classification Search
None
See application file for complete search history.

(56) References Cited

U.S. PATENT DOCUMENTS

| | | | |
|---|---|---|---|
| 5,918,014 A | 6/1999 | Robinson |
| 6,539,232 B2 | 3/2003 | Hendrey |
| 6,957,184 B2 | 10/2005 | Schmid |
| 7,069,308 B2 | 6/2006 | Abrams |
| 7,379,811 B2 | 5/2008 | Rasmussen |
| 7,539,697 B1 | 5/2009 | Akella |
| 7,752,326 B2 | 7/2010 | Smit |
| 7,783,630 B1 | 8/2010 | Chevalier |
| 7,836,044 B2 | 11/2010 | Kamvar |
| 8,027,990 B1 | 9/2011 | Mysen |
| 8,055,673 B2 | 11/2011 | Churchill |
| 8,060,639 B2 | 11/2011 | Smit |
| 8,082,278 B2 | 12/2011 | Agrawal |
| 8,112,529 B2 | 2/2012 | Van Den Oord |
| 8,135,721 B2 | 3/2012 | Joshi |
| 8,145,636 B1 | 3/2012 | Jeh |
| 8,180,804 B1 | 5/2012 | Narayanan |
| 8,185,558 B1 | 5/2012 | Narayanan |
| 8,239,364 B2 | 8/2012 | Wable |
| 8,244,848 B1 | 8/2012 | Narayanan |
| 8,271,471 B1 | 9/2012 | Kamvar |
| 8,271,546 B2 | 9/2012 | Gibbs |
| 8,301,639 B1 | 10/2012 | Myllymaki |
| 8,306,922 B1 | 11/2012 | Kunal |
| 8,312,056 B1 | 11/2012 | Peng |

(Continued)

*Primary Examiner* — Hung D Le
(74) *Attorney, Agent, or Firm* — Baker Botts L.L.P.

(57) ABSTRACT

In one embodiment, an online social network may receive, from a client system of a first user of the online social network, a search query inputted by the first user; and identify one or more of the entities matching the search query. At least a portion of the entities being identified based at least in part on a recorded geographic proximity between the first user and each identified entity. The online social network may access one or more proximity coefficients for the identified entities from a proximity-coefficient system of the online social network; calculate a score for each identified entity based at least in part on the value of the accessed proximity coefficients for the identified entity and social-graph information associated with the identified entity; and send, to the client system of the first user in response to the received search query, search results for display to the first user.

20 Claims, 6 Drawing Sheets

(56) References Cited

U.S. PATENT DOCUMENTS

| | | |
|---|---|---|
| 8,321,364 B1 | 11/2012 | Gharpure |
| 8,364,709 B1 | 1/2013 | Das |
| 8,386,465 B2 | 2/2013 | Ansari |
| 8,407,200 B2 | 3/2013 | Wable |
| 8,412,749 B2 | 4/2013 | Fortuna |
| 8,538,960 B2 | 9/2013 | Wong |
| 8,572,129 B1 | 10/2013 | Lee |
| 8,578,274 B2 | 11/2013 | Druzgalski |
| 8,595,297 B2 | 11/2013 | Marcucci |
| 8,601,027 B2 | 12/2013 | Behforooz |
| 8,606,721 B1 | 12/2013 | Dicker |
| 8,639,725 B1 | 1/2014 | Udeshi |
| 8,732,208 B2 | 5/2014 | Lee |
| 8,751,521 B2 | 6/2014 | Lee |
| 8,775,324 B2 | 7/2014 | Zhu |
| 8,782,080 B2 | 7/2014 | Lee |
| 8,782,753 B2 | 7/2014 | Lunt |
| 8,832,111 B2 | 9/2014 | Venkataramani |
| 8,868,590 B1 | 10/2014 | Donneau-Golencer |
| 8,868,603 B2 | 10/2014 | Lee |
| 8,898,226 B2 | 11/2014 | Tiu |
| 8,909,637 B2 | 12/2014 | Patterson |
| 8,914,392 B2 | 12/2014 | Lunt |
| 8,918,418 B2 | 12/2014 | Lee |
| 8,924,406 B2 | 12/2014 | Lunt |
| 8,935,255 B2 | 1/2015 | Sankar |
| 8,935,261 B2 | 1/2015 | Pipegrass |
| 8,935,271 B2 | 1/2015 | Lassen |
| 8,949,232 B2 | 2/2015 | Harrington |
| 8,949,250 B1 | 2/2015 | Garg |
| 8,949,261 B2 | 2/2015 | Lunt |
| 8,954,675 B2 | 2/2015 | Venkataramani |
| 8,983,991 B2 | 3/2015 | Sankar |
| 2002/0059199 A1 | 5/2002 | Harvey |
| 2002/0086676 A1 | 7/2002 | Hendrey |
| 2002/0196273 A1 | 12/2002 | Krause |
| 2003/0154194 A1 | 8/2003 | Jonas |
| 2003/0208474 A1 | 11/2003 | Soulanille |
| 2004/0088325 A1 | 5/2004 | Elder |
| 2004/0172237 A1 | 9/2004 | Saldanha |
| 2004/0215793 A1 | 10/2004 | Ryan |
| 2004/0243568 A1 | 12/2004 | Wang |
| 2004/0255237 A1 | 12/2004 | Tong |
| 2005/0091202 A1 | 4/2005 | Thomas |
| 2005/0125408 A1 | 6/2005 | Somaroo |
| 2005/0131872 A1 | 6/2005 | Calbucci |
| 2005/0171955 A1 | 8/2005 | Hull |
| 2005/0256756 A1 | 11/2005 | Lam |
| 2006/0041597 A1 | 2/2006 | Conrad |
| 2006/0117378 A1 | 6/2006 | Tam |
| 2006/0136419 A1 | 6/2006 | Brydon |
| 2006/0190436 A1 | 8/2006 | Richardson |
| 2007/0174304 A1 | 7/2007 | Shrufi |
| 2007/0277100 A1 | 11/2007 | Sheha |
| 2008/0005064 A1 | 1/2008 | Sarukkai |
| 2008/0033926 A1 | 2/2008 | Matthews |
| 2008/0072180 A1 | 3/2008 | Chevalier |
| 2008/0114730 A1 | 5/2008 | Larimore |
| 2008/0183694 A1 | 7/2008 | Cane |
| 2008/0183695 A1 | 7/2008 | Jadhav |
| 2008/0270615 A1 | 10/2008 | Centola |
| 2009/0006543 A1 | 1/2009 | Smit |
| 2009/0054043 A1 | 2/2009 | Hamilton |
| 2009/0094200 A1 | 4/2009 | Baeza-Yates |
| 2009/0164408 A1 | 6/2009 | Grigorik |
| 2009/0164431 A1 | 6/2009 | Zivkovic |
| 2009/0164929 A1 | 6/2009 | Chen |
| 2009/0197681 A1 | 8/2009 | Krishnamoorthy |
| 2009/0228296 A1 | 9/2009 | Ismalon |
| 2009/0259624 A1 | 10/2009 | DeMaris |
| 2009/0259646 A1 | 10/2009 | Fujita |
| 2009/0265326 A1 | 10/2009 | Lehrman |
| 2009/0271370 A1 | 10/2009 | Jagadish |
| 2009/0276414 A1 | 11/2009 | Gao |
| 2009/0281988 A1 | 11/2009 | Yoo |
| 2009/0299963 A1 | 12/2009 | Pippori |
| 2010/0049802 A1 | 2/2010 | Raman |
| 2010/0057723 A1 | 3/2010 | Rajaram |
| 2010/0082695 A1 | 4/2010 | Hardt |
| 2010/0125562 A1 | 5/2010 | Nair |
| 2010/0145771 A1 | 6/2010 | Fligler |
| 2010/0179929 A1 | 7/2010 | Yin |
| 2010/0197318 A1 | 8/2010 | Petersen |
| 2010/0228744 A1 | 9/2010 | Craswell |
| 2010/0235354 A1 | 9/2010 | Gargaro |
| 2010/0321399 A1 | 12/2010 | Ellren |
| 2011/0022602 A1 | 1/2011 | Luo |
| 2011/0078166 A1 | 3/2011 | Oliver |
| 2011/0087534 A1 | 4/2011 | Strebinger |
| 2011/0137902 A1 | 6/2011 | Wable |
| 2011/0184981 A1 | 7/2011 | Lu |
| 2011/0191371 A1 | 8/2011 | Elliott |
| 2011/0196855 A1 | 8/2011 | Wable |
| 2011/0231296 A1 | 9/2011 | Gross |
| 2011/0276396 A1 | 11/2011 | Rathod |
| 2011/0313992 A1 | 12/2011 | Groeneveld |
| 2011/0320470 A1 | 12/2011 | Williams |
| 2012/0047129 A1* | 2/2012 | Redstone ............ G06F 17/3087 707/723 |
| 2012/0047147 A1 | 2/2012 | Redstone |
| 2012/0059708 A1 | 3/2012 | Galas |
| 2012/0078916 A1* | 3/2012 | Tseng ................ G06F 17/30867 707/748 |
| 2012/0136852 A1 | 5/2012 | Geller |
| 2012/0166432 A1 | 6/2012 | Tseng |
| 2012/0166433 A1 | 6/2012 | Tseng |
| 2012/0179637 A1 | 7/2012 | Juan |
| 2012/0185472 A1 | 7/2012 | Ahmed |
| 2012/0185486 A1 | 7/2012 | Voigt |
| 2012/0209832 A1 | 8/2012 | Neystadt |
| 2012/0221581 A1 | 8/2012 | Narayanan |
| 2012/0271831 A1 | 10/2012 | Narayanan |
| 2012/0278127 A1 | 11/2012 | Kirakosyan |
| 2012/0284329 A1 | 11/2012 | Van Den Oord |
| 2012/0290950 A1 | 11/2012 | Rapaport |
| 2012/0310922 A1 | 12/2012 | Johnson |
| 2012/0311034 A1 | 12/2012 | Goldband |
| 2012/0317088 A1 | 12/2012 | Pantel |
| 2012/0331063 A1 | 12/2012 | Rajaram |
| 2013/0031106 A1 | 1/2013 | Schechter |
| 2013/0031113 A1 | 1/2013 | Feng |
| 2013/0041876 A1 | 2/2013 | Dow |
| 2013/0066876 A1 | 3/2013 | Raskino |
| 2013/0073400 A1 | 3/2013 | Heath |
| 2013/0085970 A1 | 4/2013 | Karnik |
| 2013/0086024 A1 | 4/2013 | Liu |
| 2013/0086057 A1 | 4/2013 | Harrington |
| 2013/0097140 A1 | 4/2013 | Scheel |
| 2013/0124538 A1 | 5/2013 | Lee |
| 2013/0124542 A1 | 5/2013 | Lee |
| 2013/0144899 A1 | 6/2013 | Lee |
| 2013/0191372 A1 | 7/2013 | Lee |
| 2013/0191416 A1 | 7/2013 | Lee |
| 2013/0198219 A1 | 8/2013 | Cohen |
| 2013/0204737 A1 | 8/2013 | Agarwal |
| 2013/0226918 A1 | 8/2013 | Berkhim |
| 2013/0227011 A1 | 8/2013 | Sharma |
| 2013/0246404 A1 | 9/2013 | Annau |
| 2013/0254305 A1 | 9/2013 | Cheng |
| 2014/0006416 A1 | 1/2014 | Leslie |
| 2014/0040245 A1* | 2/2014 | Rubinstein ........ G06F 17/30528 707/722 |
| 2014/0040246 A1* | 2/2014 | Rubinstein ........ G06F 17/30554 707/722 |
| 2014/0040285 A1* | 2/2014 | Rubinstein .......... G06F 17/3053 707/751 |
| 2014/0067535 A1 | 3/2014 | Rezaei |
| 2014/0122465 A1 | 5/2014 | Bilinski |
| 2014/0244751 A1* | 8/2014 | Tseng ..................... H04L 51/32 709/204 |
| 2014/0258401 A1* | 9/2014 | Tseng ..................... H04L 51/32 709/204 |

(56) References Cited

U.S. PATENT DOCUMENTS

| | | | |
|---|---|---|---|
| 2014/0344248 A1* | 11/2014 | Stoop | G06F 17/30268 707/722 |
| 2015/0019639 A1* | 1/2015 | Marlow | H04W 4/21 709/204 |
| 2015/0178397 A1* | 6/2015 | Garg | G06F 17/3053 707/722 |
| 2015/0301579 A1* | 10/2015 | Vaccari | G06F 1/3215 713/340 |
| 2015/0302092 A1* | 10/2015 | Vaccari | G06F 1/3215 707/724 |
| 2015/0370798 A1* | 12/2015 | Ju | G06F 17/30867 707/748 |

\* cited by examiner

PROXIMITY-BASED SEARCHING ON ONLINE SOCIAL NETWORKS

TECHNICAL FIELD

This disclosure generally relates to social graphs and performing searches for objects in the context of a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a social-networking system associated with an online social network may generate search results for entities based on the geographic proximity of those entities to the querying user. This may be particularly useful when users are searching for other users or locations they have met/visited after the fact. For example, if the querying user meets someone and later wants to find them on the online social network, it may be difficult for the social-networking system to suggest the correct user as a search result in response to the query, particularly if the user being searched for has a relatively common name. This search experience may be improved by using location data of the querying user and the entities, and suggesting entities that have recently been near (i.e., geographically proximate) the querying user. For entities associated with particular geographic locations, the social-networking system may calculate a proximity coefficient that is a measure of the geographic proximity between a querying user and entity. This may be recorded within a proximity graph as a proximity edge between a node corresponding to the querying user and the node corresponding to the proximate entity based at least in part on a determination that the querying user and the proximate entities were within a threshold distance from each other within a threshold period of time. This may be useful in cases when there is limited information of the querying user or the proximate entity (e.g., new users, users with low levels of activity on the online social network, users with incomplete profiles, or entities where the querying user has had little or no previous interactions).

In particular embodiments, the social-networking system may use any suitable location data to calculate the proximity coefficient. An example of location data is a location ping sent to the social-networking system when a native application is running or in the foreground of a client system. Other example location data may include socially-relevant activity from a particular location (e.g., check-ins, uploading content, or posts), BLUETOOTH beacon data, WI-FI data, ambient location data, or any combination thereof. For privacy protection, the social-networking system may only store the most recent location data associated of an entity, and/or only for a pre-determined period of time (e.g., 30 days). The social-networking system may include a proximity-coefficient system that subscribes to a location-services system associated with the online social network. From the location data provided by the location-services system, the proximity-coefficient system may identify entities that were in a particular map tile and determine which of the identified entities were within a threshold distance within a threshold period of time from the querying user. The social-networking system may then create a proximity edge between the identified entities if threshold criteria (e.g., distance and time) are met, and store this information as a proximity edge within the proximity graph.

In particular embodiments, when responding to queries, the social-networking system may then use the calculated proximity coefficients between the querying user and matching entities when retrieving and scoring search results. The social-networking system may receive a query (for example, a text string inputted into a search field), process the query, and retrieve entities matching the query. When retrieving matching entities, the social-networking system may identify a plurality of entities (e.g., 200 users), wherein a least a portion of the entities are identified based at least in part on a recorded geographic proximity between the first user and each identified entity (e.g., 10 geographical proximate users). The social-networking system may then score the identified entities based on social-graph information and proximity coefficients. The social-networking system may then send one or more search results for display to the first user, wherein each search result references an identified entity each having a score greater than a threshold score.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any

DESCRIPTION OF EXAMPLE EMBODIMENTS

System Overview

Figure 1:
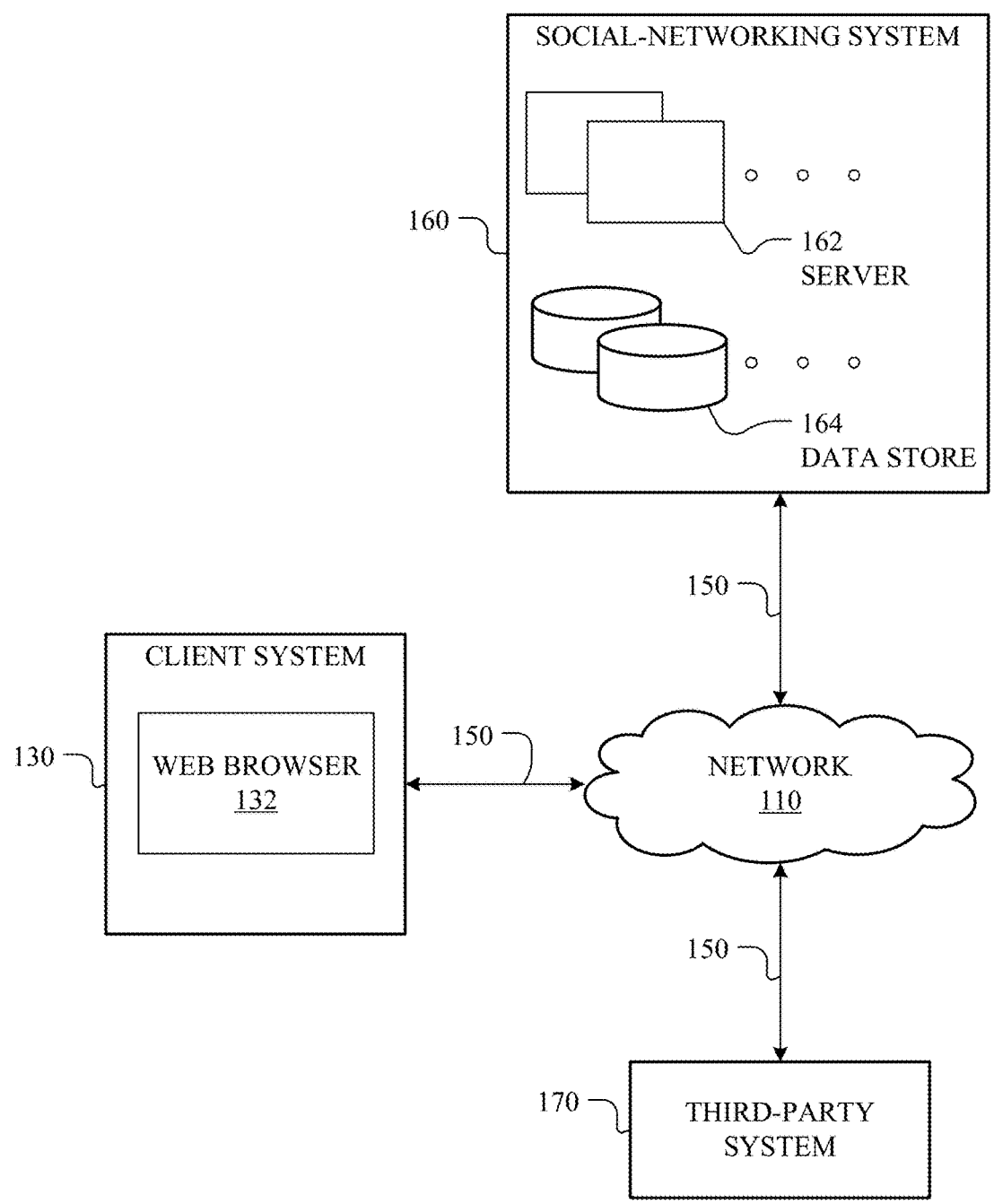
FIG. 1 illustrates an example network environment associated with a social-networking system.

FIG. 1 illustrates an example network environment 100 associated with a social-networking system. Network environment 100 includes client system 130, social-networking system 160, and third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, client system 130 may include a computer system such as a desktop computer, notebook or laptop computer, netbook, a tablet computer, e-book reader, global-positioning system (GPS) device, camera, personal digital assistant (PDA), handheld electronic device, cellular telephone, smartphone, augmented/virtual reality device, other suitable electronic device, or any suitable combination thereof. This disclosure contemplates any suitable client systems 130. Client system 130 may enable a network user at client system 130 to access network 110. Client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable client system 130, social-networking system 160, or third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, third-party system 170 may include a third-party content object provider. A third-party content object provider may include one or more sources of content objects, which may be communicated to client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to client system 130. Information may be pushed to client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as third-party system 170. Advertisement-pricing modules may combine social information, the current time, location data, or other suitable data to provide relevant advertisements, in the form of notifications, to a user.

One or more location stores of social-networking system 160 may contain a database containing location data associated with a user. The database may contain a separate location history for each user. Privacy settings may allow users to opt in or opt out of having their location data accessed, stored, or used by social-networking system 160. The location history may include location data of the user, wherein the location data may represents an instance when client system 130 of the user sent its location to social-networking system 160. In particular embodiments, the location stores may only store the most recent location of the user. In addition, the location data of the user may be stored by social-networking system 160 for a pre-determined period of time (e.g., 30 days). The location data may include the user's location determined through other sources, as described below. As an example and not by way of limitation, the location data may include location and time entries derived from the user checking-in at a particular location at a particular time (e.g., time stamp), even if client system 130 did not explicitly report its location at that time. In particular embodiments, the time stamp associated with a location may be a time range between the time of the location data and the time of a subsequent location update. As an example and not by way of limitation, if a user sends location data at 8:00 AM from a first location, and then sends location data at 8:15 AM from a second location, social-networking system 160 may record the first user as being at the first location from 8:00 AM to 8:15 AM. In particular embodiments, if the user has been stationary for multiple location readings, then social-networking system 160 may combine multiple location reading into a single location entry or data point for the time range that the user was stationary. As an example and not by way of limitation, if the user continues to send location data every 15 minutes from the second location from 8:15 AM to 8:00 PM, social-networking system 160 may consolidate the multiple readings to one location reading from the second location with a time stamp of 8:15 AM-8:00 PM.

In particular embodiments, social-networking system 160 may record each location by their geographic coordinates. In particular embodiments, social-networking system 160 may determine one or more places associated with one or more of the geographic coordinates. As an example and not by way of limitation, for a set of location data in a location history of a user, social-networking system 160 may determine three sets of geographic coordinates. Social-networking system 160 may additionally determine that the first set of coordinates corresponds to the Stanford Shopping Center in Palo Alto, Calif., based on place mapping information known to social-networking system 160. For the second set of coordinates, social-networking system 160 may determine that the user is at AT&T Park in San Francisco, Calif., based on the user being tagged in a photo also tagged with AT&T Park at the same time. For the third set of coordinates, social-networking system 160 may determine that the user is at San Francisco International Airport, based on the user checking-in at the airport.

In particular embodiments, social-networking system 160 may store both the geographic coordinates and associated places for each location reading in the location history of the user. In particular embodiments, if a user wishes to view their location history through social-networking system 160, social-networking system 160 may provide the user with the places the user was at, rather than the geographic coordinates. In particular embodiments, social-networking system 160 may include a proximity-coefficient system that may access the location stores and the proximity-coefficient system may include a calculation engine that subscribes to the location-services of client system 130. From the location data, the proximity coefficient system may identify entities that were in a particular map tile and determine which of the identified entities were within the threshold criteria from the querying user.

Location Determination Methods

In particular embodiments, location data may be sent by client system 130 to social-networking system 160 or third-party system 170 when a particular native application is being executed by or in the foreground of client system 130. As an example and not by way of limitation, location data may be sent to social-networking system 160 when the user is interacting with a social-networking application on client system 130. In particular embodiments, social-networking 160 or third-party 170 system may poll or "ping" client system 130 using an activation signal to obtain location data. As an example and not by way of limitation, social-networking system 160 may poll an application executed by client system 130 for location data by sending the activation signal activate a location service of client system 130. The activation signal may be transmitted using a wireless communication protocol, such as for example WI-FI or Long-Term Evolution (LTE). Privacy settings may allow users to opt in or opt out of having their location data accessed, stored, or used by social-networking system 160.

In particular embodiments, the location service of client system 130 may use one or more methods of location determination, such as for example, using the location of one or more cellular towers, crowd-sourced location data associated with a WI-FI hotspot, or the GPS function of client system 130. In particular embodiments, client system 130 may transmit location data and other relevant data, such as for example, the signal strength from nearby cellular towers, in response to the user interacting with a particular application (e.g., an application associated with social-networking system 160). As an example and not by way of limitation, GPS data may be used the primary source of location data depending at least in part on whether client system 130 is able to acquire GPS data. If client system 130 is unable to acquire the GPS data within a pre-determined duration, the location of client system 130 may be determined using one or more cellular towers or WI-FI hotspots. Although this disclosure describes a location service using particular methods of location determination, this disclosure contemplates a location service using any suitable method or combination of methods of location determination.

GPS-based location services may be most useful to determine the location of the client system 130 in open spaces, but it may be difficult to determine a location within a building, such as for example a mall or movie theater. In particular embodiments, the location of client system 130 may be determined through the use of BLUETOOTH LOW ENERGY (BLE) beacons. BLE beacons may be part of an indoor positioning system that extends the location services of client system 130. As an example and not by way of limitation, the location services of client system 130 may determine client system 130 is within proximity to a particular building, but the location of client system 130 may be refined using BLE beacons located within a particular store to determine if client system 130 is inside or outside the building. In connection with BLE beacons, particular embodiments may utilize one or more systems, components, elements, functions, methods, operations, or steps disclosed in U.S. patent application Ser. No. 14/565,335, filed 9 Dec. 2014, which is incorporated by reference.

BLE beacons are configured set to send a "proximity signal" at pre-determined time intervals. BLE beacons send a universally unique identifier (UUID) and a major and minor code. The UUID is used to identify a common group of beacons (e.g., associated with a particular store) and the major and minor codes may be used to uniquely associate a beacon with a given location or area of a physical space associated with a particular beacon, so that any suitably equipped device nearby (such as client system 130) may detect the beacon. As an example and not by way of limitation, an application executed on client system 130 may process the proximity signal from the BLE beacon and social-networking system 160 may determine client system 130 is inside a particular building based on the information encoded in the proximity signal.

In particular embodiments, an audio-capture application executed on client system 130 may continuously or at periodic time intervals capture audio data from a microphone of client system 130 and converts it into an audio or waveform fingerprint. As an example and not by way of limitation, the audio fingerprint may be generated using audio-feature detection algorithms (e.g., fast-Fourier transform (FFT) or discrete cosine transform (DCT)). The audio fingerprint is a compact, robust representation that summarizes the waveform or a collection of waveforms. The location of client system 130 may be refined based on audio signals captured by a microphone of client system 130. In particular embodiments, social-networking system 160 may match audio fingerprints uploaded by client system 130 to audio fingerprints stored in one or more data stores 164 described above. Waveform matching may utilize feature detection algorithms, such as for example FFTs or DCTs. Furthermore, cross-correlation with regard to either the frequency or time domain may be utilized for waveform matching. As an example and not by way of limitation, client system 130 may send location data indicating client system 130 is in the vicinity of a park. The microphone of client system 130 may capture and upload an audio waveform of a song being performed by a band playing at the park. Client system 130 or, alternatively, social-networking system 160, may access a data store 164 that may include a list of performances near the park. If a match is found between the uploaded audio waveform and one of the waveform fingerprints stored in data store 164, social-networking system 160 may infer that client system 130 is at the park and listening to a live performance.

Proximity Coefficient

In particular embodiments, social-networking system 160 may calculate a metric of interaction (which may be referred to herein as "proximity coefficient") of various entities that takes place outside of social-networking system 160. Privacy settings may allow users to opt in or opt out of having their interactions accessed, stored, or used by social-networking system 160. The proximity coefficient may represent an assessment of past interaction based on previous geographic proximity between particular entities associated with the online social network, such as users, businesses, events, or other entities associated with the online social network that are associated with geographic locations, or any suitable combination thereof. As an example and not by way of limitation, the proximity coefficient may reflect physical or "real-world" interactions between entities associated with the online social network. In particular embodiments, the proximity coefficient may also represent a probability or function that measures a predicted probability that a user may perform a particular action in relation to another user or entity based on the user's previous geographic proximities with other users or entities.

In particular embodiments, the proximity coefficient may be used to generate search results for entities based on the geographic proximity of those entities to the querying user without exposing the actual location data of the users. As an example and not by way of limitation, the proximity coefficient may be used when users are searching for other users or locations they have met/visited after the fact. If the user meets someone and later wants to find them on a social-networking website, it may be difficult for social-networking system 160 to suggest the correct user as a search result in response to a search query, particularly if the person being searched for has a relatively common name. This search experience may be improved by using the proximity coefficient and suggesting entities that have recently been near to or geographically proximate to the querying user.

The proximity coefficient may also be determined with respect to entities associated with third-party systems 170 or other suitable systems. In particular embodiments, the value of the proximity coefficient may be weighed by the frequency or number of interactions between the querying user and the identified entities. As an example and not by way of limitation, the more often a user shares a geographic proximity with particular users or places (e.g., a business, restaurant, park, venue, or landmark), the higher value of the proximity coefficient. The value of the proximity coefficient may change based on monitoring of the location data. In particular embodiments, the proximity coefficient may be implemented as a weighted linear function with components that are each modified with a weighting coefficient. Furthermore, the proximity coefficient may include multiple location-based components and each location-based component may have its own weight. In particular embodiments, one or more components may be added to or removed from the proximity coefficient to improve accuracy or to account for additional location-based components. In particular embodiments, the value of the proximity coefficient may be in a range between 0 and 1. Although this disclosure describes determining a particular proximity coefficient in a particular manner, this disclosure contemplates determining any suitable location-based metric in any suitable manner.

Map Tiles

Figure 2:
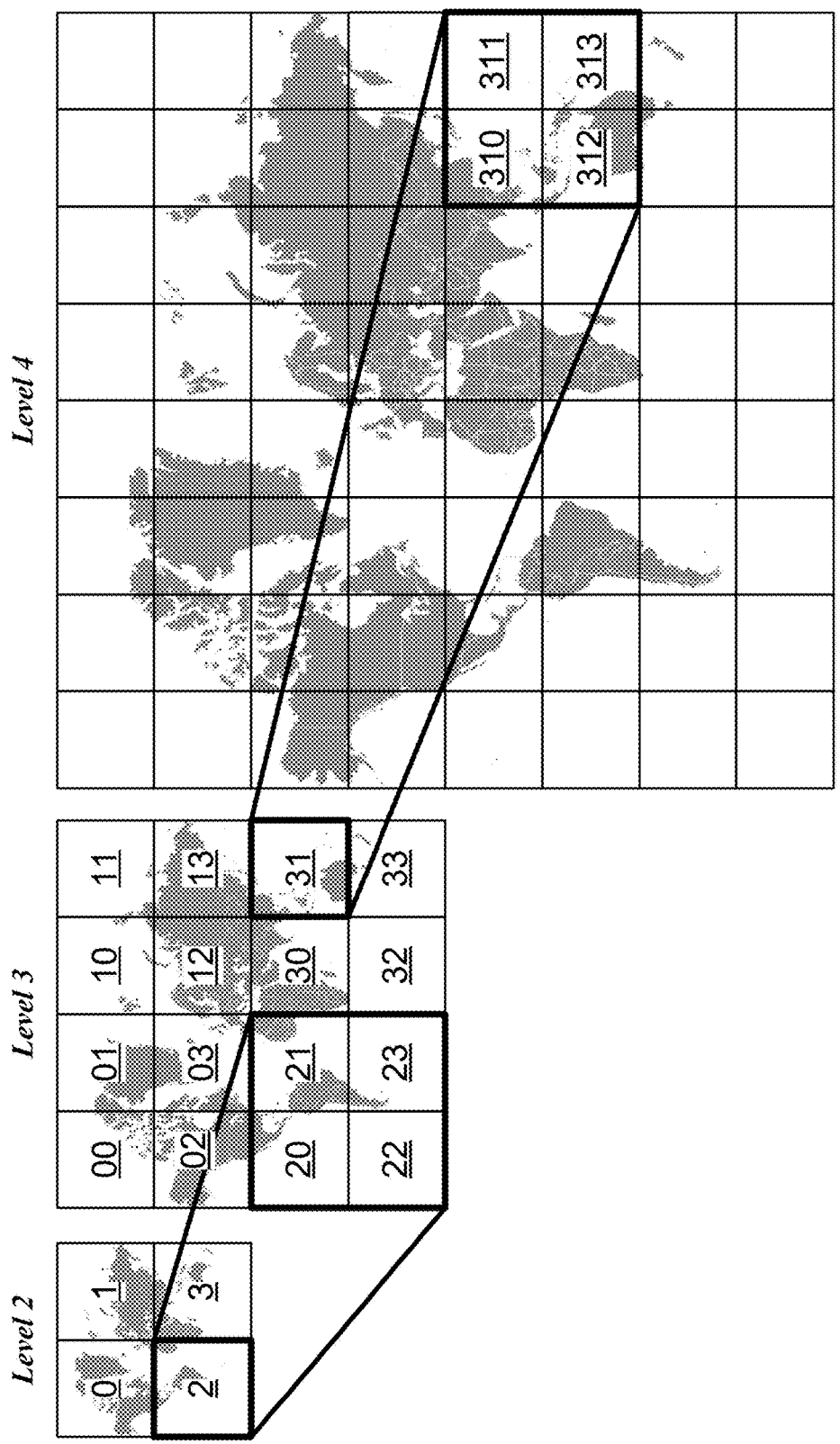
FIG. 2 illustrates example maps with example map tiles.

FIG. 2 illustrates example maps with example map tiles. In particular embodiments, a map used to represent a geographic area, such as the world or a portion thereof, a building, a campus, a park, or any other suitable place or area may be divided into map tiles (hereinafter also "tiles"). Each map tile may represent a particular geographic area of the map. Particular locations or places may be within particular tiles of a map. As an example and not by way of limitation, a location X may be within a first tile, and locations Y and Z may be within a second tile. In particular embodiments, a map may include nested levels of tiles and the tiles at each level may represent different sized portions of the map. In particular embodiments, parent nodes may represent larger portions of the map than child nodes. As an example and not by way of limitation, a map may comprise M levels of tiles, which may be labeled levels 1 to M. Level 1 may comprise a single tile representing the map (e.g., the world).

In particular embodiments, a particular level may include uniform tiles each having approximately the same size and shape, or a particular level may include tiles having a plurality of sizes or shapes (e.g., density-based tiles). In particular embodiments, a particular level may include square tiles arranged in a grid pattern. In particular embodiments, tiles may be substantially square, and the tiles of a particular level may have approximately the same size. In particular embodiments, level m may include a $2^{(m-1)}$ by $2^{(m-1)}$ grid of tiles with a total of $2^{2 \times (m-1)}$ tiles. As an example and not by way of limitation, level 5 may include a 16×16 grid with a total of 256 square-shaped tiles, each tile having approximately the same size. In the example of FIG. 2, level 2 includes four tiles, each representing one quadrant of a world map. In particular embodiments, each tile in a particular level of a map may have a unique tile identifier or tile identification, which may be referred to as a tile ID. In FIG. 2, the four tiles of level 2 have tile IDs 0, 1, 2, and 3, respectively. Level 3 in FIG. 2 is a 4×4 grid that includes sixteen tiles, where each tile from level 2 is divided into quadrants to form four additional tiles at level 3. As an example, tile 2 from level 2 is subdivided in level 3 into four tiles with tile IDs 20, 21, 22, and 23, respectively. Level 4 is an 8×8 grid that includes sixty-four tiles, where each tile from level 3 has been divided into quadrants to form four additional tiles at level 4. As an example and not by way of limitation, tile 31 from level 3 is subdivided in level 4 into four tiles with tile IDs 310, 311, 312, and 313, respectively. Although this disclosure describes dividing tiles in a level in a particular way to form additional tiles, this disclosure contemplates dividing tiles in any suitable way to form additional tiles. Moreover, although this disclosure describes and illustrates particular maps with particular tiles, this disclosure contemplates any suitable maps having any suitable tiles.

In particular embodiments, a tile in a map may include one or more entities having locations within the tile. Where a tile represents a particular geographic area, an entity or place having a location within that geographic area may be considered to be within the tile. In particular embodiments, an entity or place having a location within a particular tile may be considered associated with the tile. These entities or places may also be represented in the tree-data structure corresponding to the map tiles, where each entity or place may correspond to a sub-leaf node that is connected to the leaf node representing the tile containing the entity or place. Although this disclosure describes and illustrates particular maps with particular entities or places located within the maps, this disclosure contemplates any suitable maps having any suitable entities or places located within the maps.

In particular embodiments, social-networking system 160 may associate the most recent location of an entity with a particular map tile. As an example and not by way of limitation, the most recent location that the user interacted with a social-networking application may be associated with a particular map tile. As another example, the location of a business may be associated with a particular map tile. The most recent map tile associated with an entity may be stored in the location log described above. In connection with indexing of locations, particular embodiments may utilize one or more systems, components, elements, functions, methods, operations, or steps disclosed in U.S. Pat. No. 8,914,393, issued 16 Dec. 2014, which is incorporated by reference.

Search Queries

Figure 3:
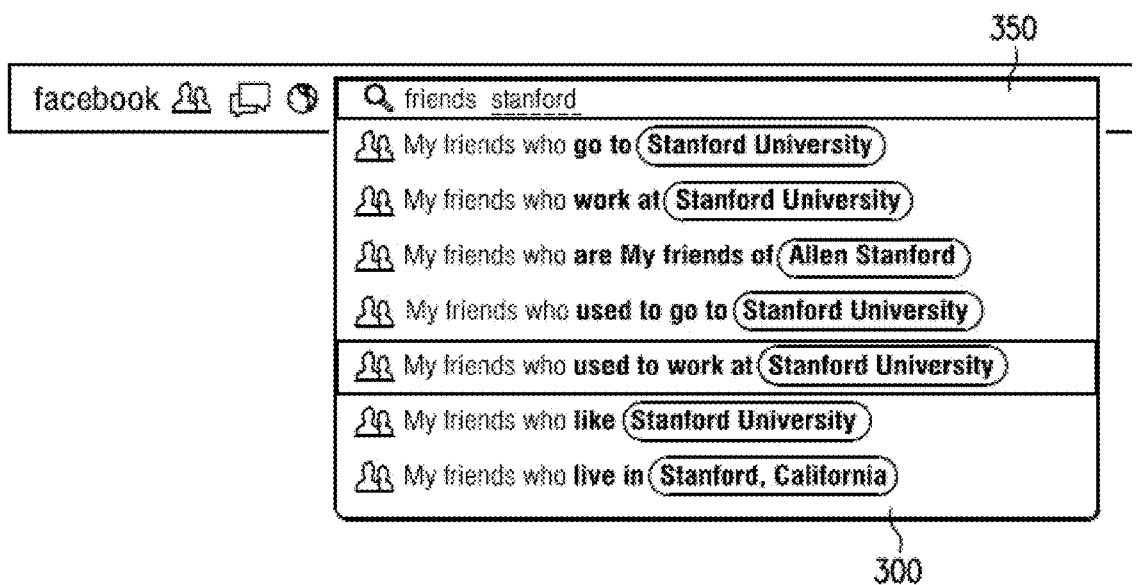
FIG. 3 illustrates an example search query on a user interface (UI).

FIG. 3 illustrates an example search query on a user interface (UI). As an example and not by way of limitation, a user may enter a text query "friends stanford" into a query field 350 of a UI. As the user enters this text query into query field 350, social-networking system 160 may provide various suggested structured queries, as illustrated in drop-down menu 300. These structured queries may be presented to the user, who can then select among the structured queries to indicate that the selected structured query should be run by social-networking system 160. By providing suggested structured queries in response to a user's text query, social-networking system 160 may provide a powerful way for users of the online social network to search for elements represented in the social graph, described below, based on their social-graph attributes and their relation to various social-graph elements. In particular embodiments, one or more client-side and/or backend (server-side) processes may implement and utilize a "typeahead" feature that may automatically attempt to match social-graph elements (e.g., user nodes, concept nodes, or edges) to information currently being entered by a user in an input form rendered in conjunction with a requested webpage (such as, for example, a user-profile page, a concept-profile page, a search-results webpage, or another suitable page of the online social network), which may be hosted by or accessible in social-networking system 160. As illustrated in the example of FIG. 3, the typeahead process may work in conjunction with one or more search frontend (client-side) and/or search backend (server-side) typeahead processes (hereinafter referred to simply as "typeahead process") executing at (or within) social-networking system 160 (e.g., within servers 162), to interactively and virtually instantaneously (as appearing to the user) attempt to auto-populate the form with a term or terms corresponding to names of existing social-graph elements, or terms associated with existing social-graph elements, determined to be the most relevant or best match to the characters of text entered by the user as the user enters the characters of text into query field 350. As an example and not by way of limitation, the typeahead feature may automatically populate the form with a reference to objects (such as, for example, the node name/type, node ID, edge name/type, edge ID, or other suitable reference or identifier) associated with the search results. In particular embodiments, the typeahead processes, in conjunction with the information from the social-graph database, as well as potentially in conjunction with various other processes, applications, or databases located within or executing within social-networking system 160, may be able to predict a user's intended declaration with a high degree of precision. More information on typeahead processes may be found in U.S. patent application Ser. No. 12/763,162, filed 19 Apr. 2010, and U.S. patent application Ser. No. 13/556,072, filed 23 Jul. 2012, each of which is incorporated by reference.

In particular embodiments, social-networking system 160 may receive a query from a user of an online social network hosted by social-networking system 160. A user may submit a query to social-networking system 160 by inputting text into a query field. A user of an online social network may search for information relating to a specific subject matter (e.g., users, concepts, external content or resources) by providing one or more keywords or a short phrase describing the subject matter, often referred to as a "search query," to a search engine associated with social-networking system 160. The query may be an unstructured text query and may comprise one or more text strings (which may include one or more n-grams). As used herein, an unstructured text query refers to a simple text string inputted by a user. In general, a querying user may input any suitable character string into a query field to search for content on social-networking system 160 that matches the text query. Although this disclosure describes querying social-networking system 160 in a particular manner, this disclosure contemplates querying social-networking system 160 in any suitable manner.

In particular embodiments, social-networking system 160 may receive from a querying/first user (corresponding to a first user node) an unstructured text query. As an example and not by way of limitation, a first user may want to search for other users who: (1) are first-degree friends of the first user; and (2) are associated with Stanford University (i.e., the user nodes are connected by an edge to the concept node corresponding to the school "Stanford"). The first user may then enter a text query "friends stanford" into a query field. The text query may, of course, be structured with respect to standard language/grammar rules (e.g. English language grammar). However, the text query will ordinarily be unstructured with respect to social-graph elements. In other words, a simple text query will not ordinarily include embedded references to particular social-graph elements. Thus, as used herein, a structured query refers to a query that contains references to particular social-graph elements, allowing the search engine to search based on the identified elements. Furthermore, the text query may be unstructured with respect to formal query syntax. In other words, a simple text query will not necessarily be in the format of a query command that is directly executable by a search engine (e.g., the text query "friends stanford" could be parsed to form the query command "intersect(school(Stanford University), friends(me))", which could be executed as a query in a social-graph database). Although this disclosure describes receiving particular queries in a particular manner, this disclosure contemplates receiving any suitable queries in any suitable manner.

In particular embodiments, social-networking system 160 may parse the unstructured text query (also simply referred to as a search query) received from the first user (i.e., the querying user) to identify one or more n-grams. In general, a n-gram is a contiguous sequence of n items from a given sequence of text or speech. The items may be characters, phonemes, syllables, letters, words, base pairs, prefixes, or other identifiable items from the sequence of text or speech. The n-gram may comprise one or more characters of text (letters, numbers, punctuation, etc.) entered by the querying user. Each n-gram may include one or more parts of the text query received from the querying user. In particular embodiments, each n-gram may comprise a character string (e.g., one or more characters of text) entered by the first user.

In particular embodiments, a typeahead process may be applied to search queries entered by a user. As an example and not by way of limitation, as a user enters text characters into a query field, a typeahead process may attempt to identify (e.g., by accessing one or more search indices) one or more social graph elements (e.g., user nodes, concept nodes, or edges) that match the string of characters entered into the query field as the user is entering the characters. As the typeahead process receives requests or calls including a string or n-gram from the text query, the typeahead process may perform or cause to be performed a search to identify existing social-graph elements having respective names, types, categories, or other identifiers matching the entered text. The typeahead process may use one or more matching algorithms to attempt to identify matching nodes or edges. When a match or matches are found, the typeahead process may send a response to the user's client system 130 that may include, for example, the names (name strings) of the matching nodes as well as, potentially, other metadata associated with the matching nodes. The typeahead process may then display a drop-down menu that displays references to the matching profile pages (e.g., a name or photo associated with the page) of the respective user nodes, or concept nodes, and displays names of matching edges that may connect to the matching nodes, which the user can then click on or otherwise select, thereby confirming the desire to search for the matched object corresponding to the selected node, or to search for objects connected to the matched users, concepts, or external objects by the matching edges. Alternatively, the typeahead process may simply auto-populate a field or form with the name or other identifier of the top-ranked match rather than display a drop-down menu. The user may then confirm the auto-populated declaration simply by keying "enter" on a keyboard or by clicking on the auto-populated declaration. Upon user confirmation of the matching nodes and/or edges, the typeahead process may send a request that informs social-networking system 160 of the user's confirmation of a query containing the matching social-graph elements. In response to the sent request, social-networking system 160 may automatically (or alternatively based on an instruction in the request) call or otherwise search a social-graph database for the matching social-graph elements, or for social-graph elements connected to the matching social-graph elements as appropriate. Although this disclosure describes applying the typeahead processes to search queries in a particular manner, this disclosure contemplates applying the typeahead processes to search queries in any suitable manner. In connection with search queries and search results, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, and U.S. patent application Ser. No. 12/978,265, filed 23 Dec. 2010, each of which is incorporated by reference.

Identifying Objects of the Search Query

In particular embodiments, in response to a query from a user, social-networking system 160 may identify a set of objects associated with an online social network hosted by social-networking system 160 that substantially match the query. In particular embodiments, social-networking system 160 may search one or more search indices on one or more data stores 164 (or, in particular embodiments, a social-graph database) to identify objects matching the query. In particular embodiments, a search engine associated with social-networking system 160 may conduct a search based on the query phrase using various search algorithms and identify objects (e.g., user-profile pages, content-profile pages, or external pages, content, or resources) that substantially match the search query. In particular embodiments, a search algorithm may be based on social-graph elements referenced in the search query, terms within the search query, user information associate with the querying user, search history of the querying user, pattern detection, other suitable information related to the query or the user, or any combination thereof.

In particular embodiments, the objects (e.g., resources or content) identified by social-networking system 160 in response to a search query may include, for example, social-graph elements (e.g., user nodes, concept nodes, or edges), profile pages (or content of profile pages), posts, comments, messages, event listings, user groups, news stories, headlines, instant messages, chat room conversations, emails, advertisements, coupons, pictures, video, music, external webpages, other suitable objects, resources, or content, or any suitable combination thereof. Although this disclosure describes particular types of identified objects, this disclosure contemplates any suitable types of identified objects. In particular embodiments, the search engine may limit its search to resources, objects, or content on the online social network. However, in particular embodiments, the search engine may also search for resources or contents on other sources, such as third-party system 170, the internet or World Wide Web, or other suitable sources.

Proximity-Based Searching

In particular embodiments, social-networking system 160 may use the proximity coefficient, described above, to determine one or more search results to be presented to a querying user. The calculated proximity coefficient may be used to disambiguate similar search results, or to score the search results for presentation to the user. As an example and not by way of limitation, the calculated proximity coefficient may be used to disambiguate suggestions in a typeahead context, queries in a structured-query context, or to generate and score a set of search results. For a querying user, social-networking system 160 may determine that the querying user may be more interested in other users or places having a similar location history relative to the querying user (e.g., possibly indicating that they have previously met, share common interests, go to the same type of places, etc.) or more interested in places near other places that the user already frequents (e.g., a dry cleaner near the user's workplace, a picture taken at the user's favorite restaurant, etc.).

In particular embodiments, social-networking system 160 may identify entities having a most recent location within a particular map tile that corresponds to the most recent location of the location history of the querying user. As described above, social-networking system 160 may have a pre-determined threshold distance and time criteria for determining if the querying user has encountered or otherwise come near another entity. As an example and not by way of limitation, one of the identified users with a most recent location within the particular map tile of the querying user and is determined to be within the pre-determined threshold distance within at least the required time may be considered by social-networking system 160 to be "geographically proximate" to each other. In particular embodiments, social-networking system 160 may modify a "proximity" graph that includes a "proximity" edge connecting nodes corresponding the identified entities to a node corresponding to the querying user when the threshold criteria (e.g., threshold distance and time) are met. Privacy settings may allow users to opt in or opt out of having their location history stored within a proximity graph. In particular embodiments, the proximity edge connecting the node corresponding to the querying user to the node corresponding to a particular identified entity in the proximity graph may be deleted after a pre-determined period of time has elapsed.

When responding to search queries, social-networking system 160 may use the calculated proximity coefficient between the querying user and identified entities when retrieving and scoring the search results. As an example and not by way of limitation, social-networking system 160 may receive a query (for example, a string inputted into the query field), process the search query, and retrieve one or more entities matching the query and the value of their respective proximity coefficient. When retrieving identified entities, a search backend may retrieve a pre-determined number of users (e.g., 200 users) of which at least a portion of the retrieved users (e.g., 10 geographically proximate users) may be identified based at least in part on a recorded geographic proximity between the first user and each identified entity. Alternatively, the search backend may access a pre-determined number (e.g, 200) of top-ranked proximity coefficients for the querying user in response to the query and identify entities that correspond to the top-ranked proximity coefficients and that match the search query. Although this disclosure describes identifying particular objects in response to a search query in a particular manner, this disclosure contemplates identifying any suitable objects in response to a search query in any suitable manner.

In particular embodiments, after identifying a set of entities matching a search query, social-networking system 160 may score each identified entities. In particular embodiments, the identified entities may be scored or ranked based on one or more scoring/ranking algorithms. As an example and not by way of limitation, entities that are more relevant to the search query or the user may be scored higher than entities that are less relevant. In particular embodiments, social-networking system 160 may select one or more of the identified entities based on the scoring/ranking of the entities, for example, by selecting one or more entities having a score or rank greater than the threshold score or rank. The scoring/ranking process may enhance search quality by identifying high-quality entities to use as search results.

In particular embodiments, social-networking system 160 may score the retrieved entities based at least in part on the calculated proximity coefficients, where identified entities that are geographically proximate to the querying user may be scored higher than non-proximate entities. The value of the proximity coefficient may be calculated on-demand at the time of the request, or may be pre-calculated by a backend proximity-coefficient system and accessed at the time of request. In particular embodiments, the components or weights of the proximity coefficient may be calculated based on the historical location data or other sensor data of the entities. In particular embodiments, the value of the proximity coefficient for the identified entities may be weighted based on the number of instances or frequency of recorded geographic proximity between the querying user and each of the identified entities. As an example and not by way of limitation, the components of the proximity coefficient may be based on the number of times two users met or spent time together based on being within a pre-determined distance of each other at the same time. In particular embodiments, the proximity coefficient may be calculated based on the location data sent when two users interact with a social-networking application at the same geo-location, such as for example a restaurant. In particular embodiments, the proximity coefficient calculation may be based on location data received from client system 130 without explicit action by each user. Privacy settings may allow users to opt in or opt out of having their interactions accessed, stored, or used by social-networking system 160.

In particular embodiments, the value of the proximity coefficient for the identified entities may be weighted based on a recency of the recorded geographic proximity between the first user and each of the identified entities. As an example and not by way of limitation, the proximity coefficient may have an associated time-decay factor in which the value of the proximity coefficient decays as a function of time. The value of the proximity coefficient may decay the effect of historical location data based on an understanding about how location data may become less relevant with the passage of time. Various decay mechanisms may be used for this purpose. As an example and not by way of limitation, the value of the proximity coefficient may decay in accordance with a mathematical function, such as an exponential function. Although this disclosure describes calculating a particular proximity coefficient in a particular manner, this disclosure contemplates calculating any suitable proximity coefficient in any suitable manner.

In particular embodiments, the identified entities may be subsequently ranked based at least in part on their proximity-coefficient-based scoring. As an example and not by way of limitation, user Alice may submit a search query on social-networking system 160 for a user named "John Doe." Social-networking system 160 may generate a set of search results responsive to this query, wherein the set of search results comprises five users named John Doe: John Doe 1, John Doe 2, John Doe 3, John Doe 4, and John Doe 5. Social-networking system 160 may then rank the five John Does for presentation to Alice. The ranking may first consider the social-networking metric (e.g., affinity as described below) of any of the John Does with respect to Alice. In this example, John Doe 1 may be a friend of Alice on social-networking system 160, while the other John Does are friends of friends. Therefore, social-networking system 160 may rank John Doe 1 first. For the remaining John Does, social-networking system 160 may not be able to distinguish any differences between the remaining four users based on the initial criterion. Social-networking system 160 may use the calculated proximity coefficient to further rank the remaining John Does. As described above, the proximity coefficient may be calculated based on the location history comparison. As an example and not by way of limitation, social-networking system 160 may determine, based on location data, that Alice was at the same location as John Doe 2 for two hours last month, and that Alice was within 20 yards of John Doe 3 for 30 minutes the previous day, while there was no encounter between Alice and John Does 4 and 5, and may calculate the proximity coefficient for each user with respect to Alice. Based on the calculated proximity coefficient, social-networking system 160 may rank John Does 2 and 3 higher than John Does 4 and 5. Furthermore, the value of the proximity coefficient for John Doe 2 may be lower than the value of the proximity coefficient John Doe 3, which is decayed due to the encounter being one month old, as described above. Therefore, social-networking system 160 may rank John Doe 3 ahead of John Doe 2. In particular embodiments, social-networking system 160 may also update or generate a proximity coefficient for all users matching the search request. As an example and not by way of limitation, social-networking system 160 may also update or generate the proximity coefficient for Alice with respect to John Doe 1, even though it was not required to rank John Doe 1.

As another example, social-networking system 160 may use the proximity coefficient to generate and rank a set of search results associated with a particular geo-location. As an example and not by way of limitation, the search results may reference an entity associated with a place of business having a fixed location, or may include content having an associated location, such as an image shared on social-networking system 160 with a tagged location of where the image was taken. User Alice may submit a search query for "The Starlight Restaurant" and social-networking system 160 may determine that there are three restaurants with that name. The user may not have any activity on social-networking system 160 relating to any of the restaurants, such as check-ins or tags associated with the restaurants, but social-networking system 160 may be able to rank the three restaurants based on physical proximity to Alice at the time she submitted the search. If all three restaurants are very far away, social-networking system 160 may not be able to determine solely based on the distance which should be ranked first. Social-networking system 160 may use the calculated proximity coefficient based on the most recent location data that Alice was at a location within 50 yards of a particular Starlight Restaurant three days ago, and that Alice has never been near the other two locations. Social-networking system 160 may then present the Starlight Restaurant that Alice has been near first in the set of search results based on the value of the proximity coefficient.

In particular embodiments, social-networking system 160 may only update proximity coefficient when there is a need to update the proximity coefficient. If the proximity coefficient is used as a signal in determining social-graph affinity, then social-networking system 160 may update a first user's proximity coefficient with respect to a second user when social-networking system 160 is updating the first user's social-graph affinity with respect to the second user. In particular embodiments, if the proximity coefficient is only being used to select and rank particular search results, then social-networking system 160 may update proximity coefficients on an as-needed basis. As an example and not by way of limitation, in the situation above where user Alice is searching for John Doe, social-networking system 160 may update the proximity coefficient for Alice with respect to all users named John Doe, but may refrain from updating the proximity coefficient for all other users of social-networking system 160, until Alice makes a request for the other user which would require an updated proximity coefficient.

In particular embodiments, a proximity coefficient may be identical for a first user with respect to a second user, and the second user with respect to the first user. If social-networking system 160 updates a proximity coefficient for the first user with respect to the second user, it may automatically update the proximity coefficient for the second user with respect to the first user. As an example and not by way of limitation, in the situation above where Alice has only searched for John Doe, then social-networking system 160 would not update the proximity coefficient for Alice with respect to user Jane Doe. However, if Jane Doe later submits a search query for Alice, social-networking system 160 may update the proximity coefficient for Jane Doe with respect to Alice, and automatically update Alice's proximity coefficient with respect to Jane Doe. In connection with disambiguating search results based on location data, particular embodiments may utilize one or more systems, components, elements, functions, methods, operations, or steps disclosed in U.S. patent application Ser. No. 14/323,975, filed 3 Jul. 2014 and U.S. patent application Ser. No. 13/672,404, filed 8 Nov. 2012, each of which is incorporated by reference.

Generating Search Results

In particular embodiments, social-networking system 160 may generate one or more search results corresponding to one or more of the identified entities, respectively, each search result including a reference to a corresponding identified entity. The search results may be sorted in any suitable order (e.g., ranked order based on score) and then sent to client system 130 for display to the user. The search results (e.g., the identified entities or their corresponding profile pages) may be scored (or ranked) and presented to the user according to their relative degrees of relevance to the search query, as determined by the particular search algorithm used to generate the search results. The search results may also be scored and presented to the user according to their relative degree of relevance to the user. The search results may be scored or ranked based on one or more factors (e.g., impressions, interactions, weighted match to the search query or other query constraints, social-graph affinity, search history, etc.), and the top 5, 10, 20, 50, or any suitable number of results may then be generated as search results for presentation to the querying user. In particular embodiments, social-networking system 160 may only send search results corresponding to identified entities having a score/rank over a particular threshold score/rank. As an example and not by way of limitation, social-networking system 160 may only send the top ten results back to the querying user in response to a particular search query. In particular embodiments, the particular threshold score/rank may be fixed or pre-determined, or may dynamically vary based on a search-query type, number of identified entities, quality of matches, or other suitable criteria. The ranked search results may then be sent to a search frontend and provided to the user for display. Although this disclosure describes generating particular search results in a particular manner, this disclosure contemplates generating any suitable search results in any suitable manner.

Privacy

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photos albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 504 corresponding to a particular photo may have a privacy setting specifying that the photo may be accessed only by users tagged in the photo and the tagged user's friends. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 500. A privacy setting may be specified for one or more edges 506 or edge-types of social graph 500, or with respect to one or more nodes 502, 504 or node-types of social graph 500. The privacy settings applied to a particular edge 506 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 504 connected to a user node 502 of the first user by an edge 506. The first user may specify privacy settings that apply to a particular edge 506 connecting to the concept node 504 of the object, or may specify privacy settings that apply to all edges 506 connecting to the concept node 504. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

Privacy settings associated with an object may specify any suitable granularity of permitted access or denial of access. As an example and not by way of limitation, access or denial of access may be specified for particular users (e.g., only me, my roommates, my boss), users within a particular degrees-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. In particular embodiments, access or denial of access may be specified by time or date. As an example and not by way of limitation, a user may specify that a particular image uploaded by the user is visible to the user's friends for the next week. As another example and not by way of limitation, a company may post content related to a product release ahead of the official launch, and specify that the content may not be visible to other users until after the product launch. In particular embodiments, access or denial of access may be specified by geographic location. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from be sent to the user. In the search-query context, an object may be provided as a search result only if the querying user is authorized to access the object, e.g., the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on an online social network, or other computing system As an example and not by way of limitation, a first user may view one or more second users of an online social network through a "People You May Know" function of the online social network, or by viewing a list of friends of the first user. As an example and not by way of limitation, a first user may specify that they do not wish to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users that attend the same university as the first user may view the first user's pictures, but that other users that are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, privacy settings may allow a user to specify whether particular applications or processes may access, store, or use particular objects or information associated with the user. The privacy settings may allow users to opt in or opt out of having objects or information accessed, stored, or used by specific applications or processes. The social-networking system 160 may access such information in order to provide a particular function or service to the user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160. As another example and not by way of limitation, social-networking system 160 may have functionalities that may use as inputs personal or biometric information of the user. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As yet another example and not by way of limitation, an online social network may provide functionality for a user to provide voice-print recordings to the online social network. As an example and not by way of limitation, if a user wishes to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to send voice messages, to improve voice recognition in order to use voice-operated features of the online social network), and further specify that such voice recording may not be shared with any third-party system 170 or used by other processes or applications associated with the social-networking system 160.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 160 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, social-networking system 160 may use a user's previous activities and calculated moods or sentiments to determine a present mood or sentiment. A user who wishes to enable this functionality may indicate in their privacy settings that they opt in to social-networking system 160 receiving the inputs necessary to determine the mood or sentiment. As an example and not by way of limitation, social-networking system 160 may determine that a default privacy setting is to not receive any information necessary for determining mood or sentiment until there is an express indication from a user that social-networking system 160 may do so. In particular embodiments, social-networking system 160 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, social-networking system 160 may use the user's mood or sentiment to provide newsfeed items, pages, friends, or advertisements to a user. The user may specify in their privacy settings that social-networking system 160 may determine the user's mood or sentiment. The user may then be asked to provide additional privacy settings to indicate the purposes for which the user's mood or sentiment may be used. The user may indicate that social-networking system 160 may use his or her mood or sentiment to provide newsfeed content and recommend pages, but not for recommending friends or advertisements. Social-networking system 160 may then only provide newsfeed content or pages based on user mood or sentiment, and may not use that information for any other purpose, even if not expressly prohibited by the privacy settings.

In particular embodiments, the social-networking system 160 may temporarily access, store, or use particular objects or information associated with a user in order to facilitate particular actions of the first user, and may subsequently delete the objects or information. As an example and not by way of limitation, a first user may transmit a message to a second user, and the social-networking system 160 may temporarily store the message in a data store 164 until the second user has view or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164. In particular embodiments, a user may specify whether particular types of objects or information associated with the user may be accessed, stored, or used by the social-networking system 160. As an example and not by way of limitation, a user may specify that images sent by the user through the social-networking system 160 may not be stored by the social-networking system 160. As another example and not by way of limitation, a first user may specify that messages sent from the first user to a particular second user may not be stored by the social-networking system 160. As yet another example and not by way of limitation, a user may specify that all objects sent via a particular application may be saved by the social-networking system 160.

In particular embodiments, privacy settings may allow a user to specify whether particular objects or information associated with the user may be accessed from particular client systems 130 or third-party systems 170. The privacy settings may allow users to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the user may be prompted to specify a particular privacy setting for each context. As an example and not by way of limitation, a user may utilize a location-services feature of the social-networking system 160 to provide recommendations for restaurants or other places in proximity to the user. The user's default privacy settings may specify that the social-networking system 160 may use location information provided from a client device 130 of the user to provide the location-based services, but that the social-networking system 160 may not store the location information of the user or provide it to any third-party system 170. The user may then update the privacy settings to allow location information to be used by a third-party image-sharing application in order to geo-tag photos.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing particular privacy setting, a prompt may be presented to the user to remind the user of his or her current privacy settings and asking the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of that the user's current privacy settings of being visible only to friends, and a warning that this change will make all of the users past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

Sending Search Results

In particular embodiments, social-networking system 160 may send, responsive to the query, one or more search results for display to the querying user. The search results may be sent to the user, for example, in the form of a list of links on a search-results page, each link being associated with a different webpage that contains some of the identified resources or content. In particular embodiments, each link in the search results may be in the form of a Uniform Resource Locator (URL) that specifies where the corresponding webpage is located and the mechanism for retrieving it. Social-networking system 160 may then send the search-results page to the web browser 132 on the user's client system 130. The user may then click on the URL links or otherwise select the content from the search-results webpage to access the content from social-networking system 160 or from an external system (such as, for example, third-party system 170), as appropriate. In particular embodiments, each search result may include a link to a profile page and a description or summary of the profile page (or the node corresponding to that page). The search results may be presented and sent to the querying user as a search-results page.

Figure 4:
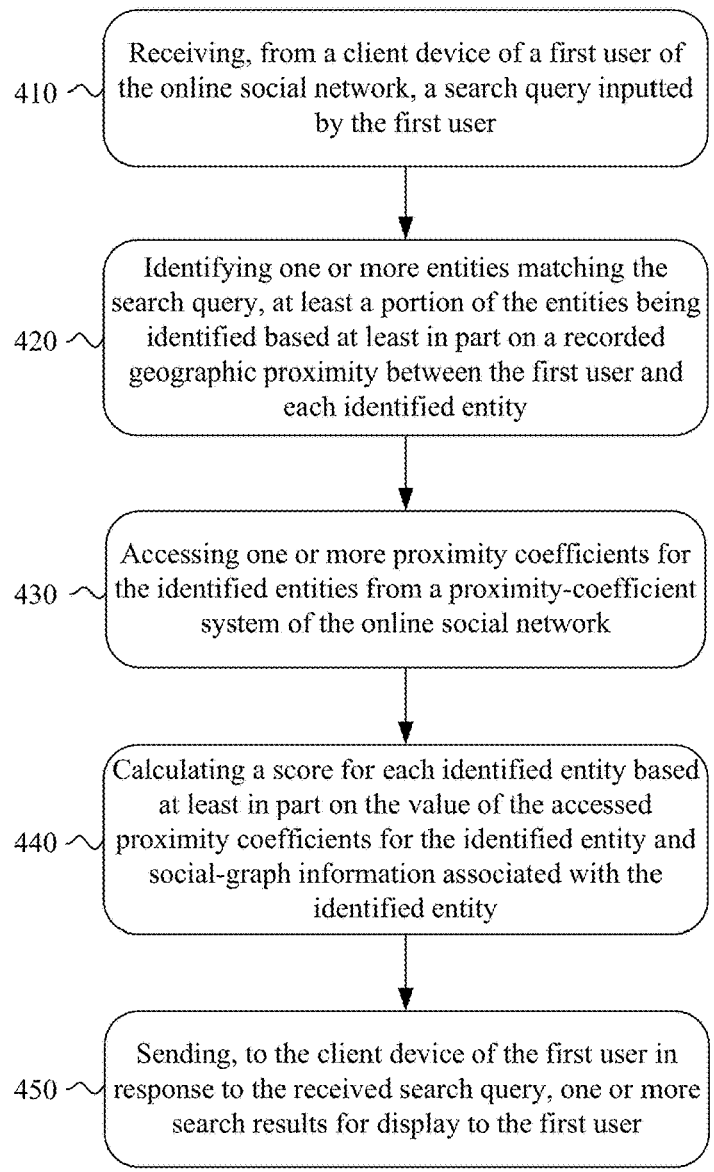
FIG. 4 illustrates an example method for searching and scoring objects using a proximity coefficient.

FIG. 4 illustrates an example method for searching and scoring objects using a proximity coefficient. The method 400 may begin at step 410, where a search query is received from a client system of a user of the online social network. At step 420, one or more entities matching the search query may be identified. In particular embodiments, at least a portion of the entities may be identified based at least in part on a recorded geographic proximity between the first user and each of the identified entities, as described above. Privacy settings may allow users to opt in or opt out of having their location data accessed, stored, or used by social-networking system 160. At step 430, social-networking system 160 may access one or more proximity coefficients for the identified entities from a proximity-coefficient system of social-network system 160. Alternatively, a predetermined number (e.g., 200) of top-ranked proximity coefficients for the querying user may be accessed. Entities that correspond to the top-ranked proximity coefficients and that match the search query, as described above, may be identified. At step 440, social-networking system 160 may calculate a score for each identified entity based at least in part on the value of the accessed proximity coefficients for the identified entity and social-graph information associated with the identified entity. At step 450, social-networking system 160 may send, to the client system of the first user in response to the received search query, one or more search results for display to the first user. In particular embodiments, each search result may reference an identified object having a score greater than a threshold score. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for searching and ranking objects using a proximity coefficient including the particular steps of the method of FIG. 4, this disclosure contemplates any suitable method for searching and ranking objects in response to any suitable query including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Social Graphs

Figure 5:
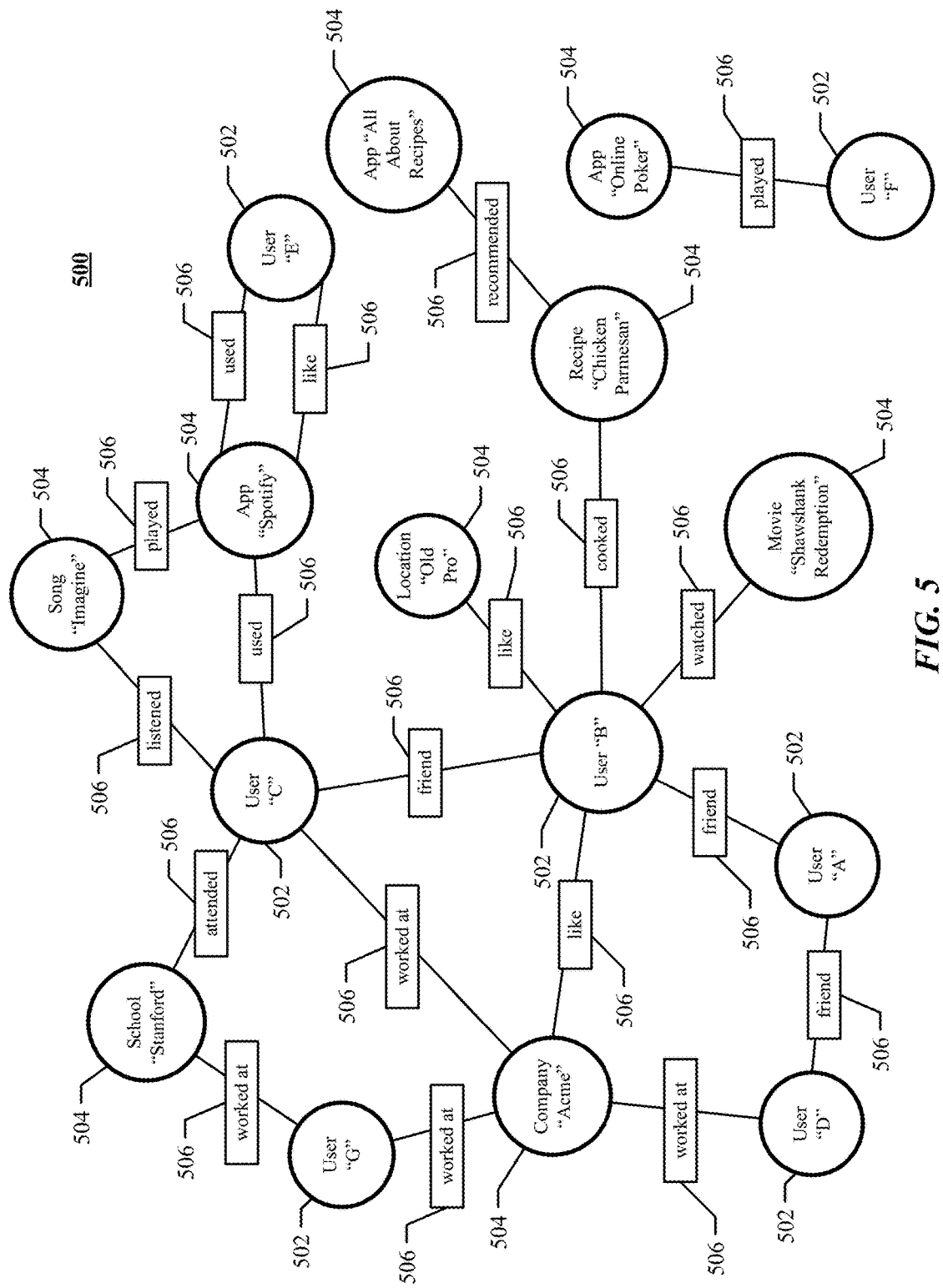
FIG. 5 illustrates an example social graph.

FIG. 5 illustrates an example social graph 500. In particular embodiments, social-networking system 160 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 160, client system 130, or third-party system 170 may access social graph 500 and related social-graph information for suitable applications. The nodes and edges of social graph 500 may be stored as data objects, for example, in a data store (such as a social-graph database). Such a data store may include one or more searchable or queryable indices of nodes or edges of social graph 500.

In particular embodiments, a user node 502 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 160. In particular embodiments, a user node 502 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages.

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 504 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to one or more webpages.

In particular embodiments, a node in social graph 500 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 506 connecting the first user's user node 502 to the second user's user node 502 in social graph 500 and store edge 506 as social-graph information in one or more of data stores 164. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 160 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 160 may create an edge 506 between a user node 502 and a concept node 504 in social graph 500. As an example and not by way of limitation, a user viewing a concept-profile page (such as, for example, by using a web browser or a special-purpose application hosted by the user's client system 130) may indicate that he or she likes the concept represented by the concept node 504 by clicking or selecting a "Like" icon, which may cause the user's client system 130 to send to social-networking system 160 a message indicating the user's liking of the concept associated with the concept-profile page. In response to the message, social-networking system 160 may create an edge 506 between user node 502 associated with the user and concept node 504, as illustrated by "like" edge 506 between the user and concept node 504. In particular embodiments, social-networking system 160 may store an edge 506 in one or more data stores. In particular embodiments, an edge 506 may be automatically formed by social-networking system 160 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

Social Graph Affinity and Coefficient

In particular embodiments, social-networking system 160 may determine the social-graph affinity (which may be referred to herein as "affinity") of various entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location data, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 500, social-networking system 160 may analyze the number and/or type of edges 506 connecting particular user nodes 502 and concept nodes 504 when calculating a coefficient. As an example and not by way of limitation, user nodes 502 that are connected by a spouse-type edge (representing that the two users are married) may be assigned a higher coefficient than a user nodes 502 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 500. As an example and not by way of limitation, entities that are closer in the social graph 500 (i.e., fewer degrees of separation) may have a higher coefficient than entities that are further apart in the social graph 500.

In particular embodiments, social-networking system 160 may calculate a coefficient based on location data. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

Systems and Methods

Figure 6:
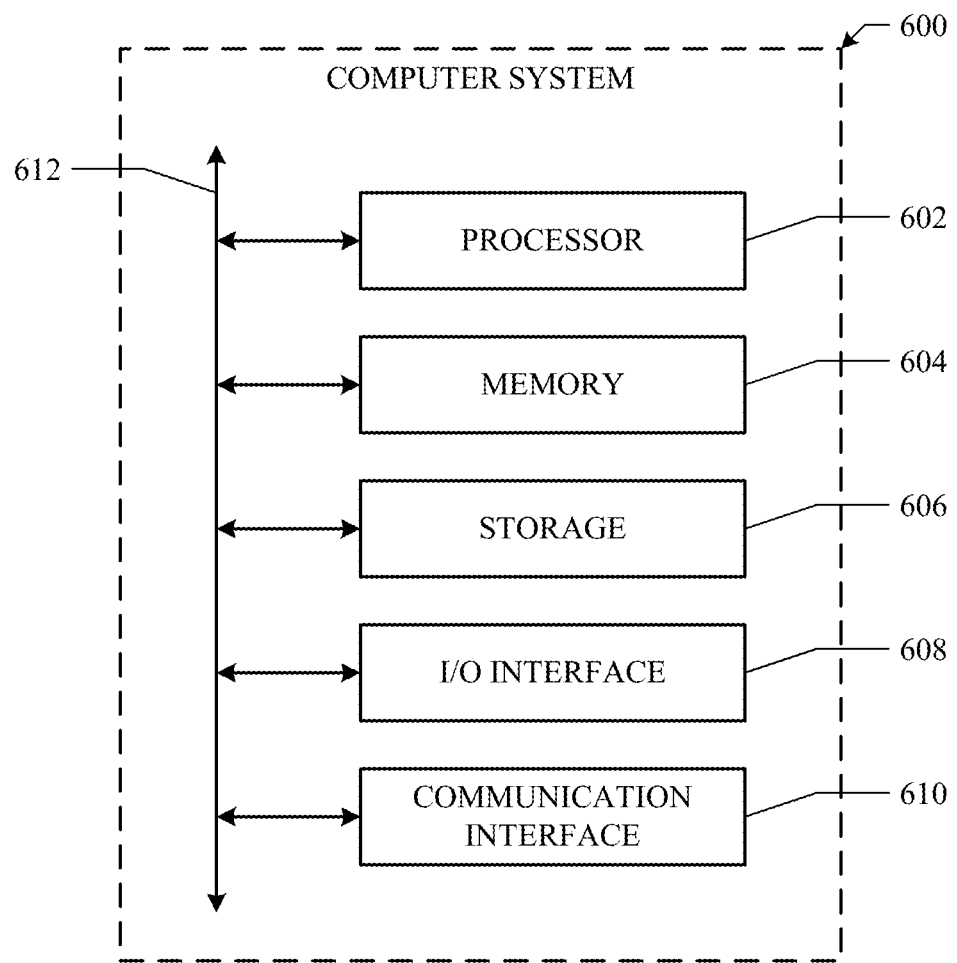
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices of an online social network:
    receiving, from a client system of a first user of the online social network, a search query inputted by the first user;
    accessing a proximity graph from a proximity-coefficient system of the online social network, wherein the proximity graph comprises:
        a first node corresponding to the first user;
        a plurality of second nodes corresponding to a plurality of entities, respectively;
        a plurality of proximity edges connecting the nodes, wherein each proximity edge is associated with a corresponding proximity coefficient that is weighted based on a geographic distance between entities corresponding to the nodes and a period of time the entities corresponding to the nodes were within a threshold distance of each other;
    identifying one or more entities of the plurality of entities matching the search query, at least a portion of the entities being identified based at least in part on whether there is a proximity edge connecting the nodes corresponding to the first user and the identified entity;
    accessing, from the proximity graph of the proximity-coefficient system, a proximity coefficient for each identified entity corresponding to a node connected to the first node by a proximity edge, wherein each proximity coefficient is based on a geographic distance between the first user and the respective identified entity and the period of time the first user and the identified entity were within the threshold distance of each other;
    calculating a score for each identified entity based at least in part on the value of the accessed proximity coefficient for the identified entity and social-graph information associated with the identified entity; and
    sending, to the client system of the first user in response to the received search query, instructions for presenting one or more search results for display to the first user, wherein each search result references an identified entity each having a score greater than a threshold score.

2. The method of claim 1, wherein the proximity edges are determined based on location data of the user and location data of each of the entities.

3. The method of claim 2, wherein the location data comprises a location data from a native application of the client system.

4. The method of claim 2, wherein the location data comprises a check-in, data of a BLUETOOTH beacon, WI-FI data, or data of a location service of a mobile computing device.

5. The method of claim 2, wherein the location data is stored for a pre-determined period of time.

6. The method of claim 2, wherein the identifying comprises:
determining a map tile of the first user based on the location data; and
identifying one or more of the entities that are located within the map tile of the first user within a threshold period of time.

7. The method of claim 6, further comprising updating the determined map tile of the first user based on updated location data.

8. The method of claim 1, further comprising:
determining the first user and one or more of the identified entities are within a threshold distance from each other within a threshold period of time;
and
creating, based on the determination, a proximity edge within the proximity graph connecting the node corresponding to the first user to a particular node corresponding to a particular identified entity.

9. The method of claim 8, further comprising deleting the proximity edge connecting the node corresponding to the first user with the node corresponding to the particular identified entity in the proximity graph after a pre-determined period of time has elapsed.

10. The method of claim 1, wherein, for each identified entity, the value of the proximity coefficient for the identified entity is weighted based on a number of instances of recorded geographic proximity between the first user and the identified entity.

11. The method of claim 1, wherein, for each identified entity, the value of the proximity coefficient for the identified entity is weighted based on a recency of the proximity edge between the first user and the identified entity.

12. The method of claim 1, wherein the values of the proximity coefficients decay as a function of time.

13. The method of claim 1, wherein the identification is further based on an social-graph affinity between the first user and each identified entity.

14. The method of claim 1, wherein the search query is received from a typeahead process.

15. The method of claim 1, wherein the search query is inputted into a search field, and wherein the search results are displayed in a drop-down menu adjacent to the search field.

16. The method of claim 1, wherein the search results comprise information identifying the identified entities.

17. The method of claim 1, wherein the search query is a text string comprising one or more n-grams.

18. The method of claim 1, wherein the search query is a structured query comprising references to one or more social-graph elements.

19. One or more computer-readable non-transitory storage media embodying software that is operable when executed to:
receive, from a client system of a first user of the online social network, a search query inputted by the first user;
access a proximity graph from a proximity-coefficient system of the online social network, wherein the proximity graph comprises:
a first node corresponding to the first user;
a plurality of second nodes corresponding to a plurality of entities, respectively;
a plurality of proximity edges connecting the nodes, wherein each proximity edge is associated with a corresponding proximity coefficient that is weighted based on a geographic distance between entities corresponding to the nodes and a period of time the entities corresponding to the nodes were within a threshold distance of each other;
identify one or more entities of the plurality of entities matching the search query, at least a portion of the entities being identified based at least in part on whether there is a proximity edge connecting the nodes corresponding to the first user and the identified entity;
access, from the proximity graph of the proximity-coefficient system, a proximity coefficient for each identified entity corresponding to a node connected to the first node by a proximity edge, wherein each proximity coefficient is based on a geographic distance between the first user and the respective identified entity and the period of time the first user and the identified entity were within the threshold distance of each other;
calculate a score for each identified entity based at least in part on the value of the accessed proximity coefficient for the identified entity and social-graph information associated with the identified entity; and
send, to the client system of the first user in response to the received search query, instructions for presenting one or more search results for display to the first user, wherein each search result references an identified entity each having a score greater than a threshold score.

20. A system comprising: one or more processors; and a memory coupled to the processors comprising instructions executable by the processors, the processors operable when executing the instructions to:
receive, from a client system of a first user of the online social network, a search query inputted by the first user;
access a proximity graph from a proximity-coefficient system of the online social network, wherein the proximity graph comprises:
a first node corresponding to the first user;
a plurality of second nodes corresponding to a plurality of entities, respectively;
a plurality of proximity edges connecting the nodes, wherein each proximity edge is associated with a corresponding proximity coefficient that is weighted based on a geographic distance between entities corresponding to the nodes and a period of time the entities corresponding to the nodes were within a threshold distance of each other;
identify one or more entities of the plurality of entities matching the search query, at least a portion of the entities being identified based at least in part on whether there is a proximity edge connecting the nodes corresponding to the first user and the identified entity;
access, from the proximity graph of the proximity-coefficient system, a proximity coefficient for each identified entity corresponding to a node connected to the first node by a proximity edge, wherein each proximity coefficient is based on a geographic distance between the first user and the respective identified entity and the period of time the first user and the identified entity were within the threshold distance of each other;

calculate a score for each identified entity based at least in part on the value of the accessed proximity coefficient for the identified entity and social-graph information associated with the identified entity; and send, to the client system of the first user in response to the received search query, instructions for presenting one or more search results for display to the first user, wherein each search result references an identified entity each having a score greater than a threshold score.

* * * * *